(12) United States Patent
Hahn et al.

(10) Patent No.: US 10,584,588 B2
(45) Date of Patent: Mar. 10, 2020

(54) PUMP DEVICE

(71) Applicant: EBM-PAPST ST. GEORGEN GMBH & CO. KG, St. Georgen (DE)

(72) Inventors: Alexander Hahn, Eigeltingen-Heudorf (DE); Hassan Ghodsi-Khameneh, Offenburg (DE)

(73) Assignee: ebm-papst St. Georgen GmbH & Co. KG, St. Georgen (DE)

(*) Notice: Subject to any disclaimer, the term of this patent is extended or adjusted under 35 U.S.C. 154(b) by 198 days.

(21) Appl. No.: 15/557,126

(22) PCT Filed: Mar. 31, 2016

(86) PCT No.: PCT/EP2016/057159
§ 371 (c)(1),
(2) Date: Sep. 10, 2017

(87) PCT Pub. No.: WO2016/173802
PCT Pub. Date: Nov. 3, 2016

(65) Prior Publication Data
US 2018/0045051 A1 Feb. 15, 2018

(30) Foreign Application Priority Data

Apr. 29, 2015 (DE) .......................... 10 2015 106 614

(51) Int. Cl.
*F03C 2/00* (2006.01)
*F03C 4/00* (2006.01)
*F04C 2/00* (2006.01)
*F04C 18/00* (2006.01)
*F01C 5/02* (2006.01)
(Continued)

(52) U.S. Cl.
CPC .................. *F01C 5/02* (2013.01); *F04C 5/00* (2013.01); *F16C 19/54* (2013.01);
(Continued)

(58) Field of Classification Search
CPC .......... F01C 5/02; F01C 21/0845; F04C 5/00; F04C 2240/30; F05C 2225/00; F16C 19/54; F16C 2360/44
(Continued)

(56) References Cited

U.S. PATENT DOCUMENTS 3,408,947 A * 11/1968 McMillan ............... F04B 43/14
418/45
3,789,740 A * 2/1974 Boyer ..................... F16C 19/54
91/486
(Continued)

FOREIGN PATENT DOCUMENTS

DE 2911609 A 9/1980 ............... F04C 5/00
DE 2945042 A 5/1981 ............... F04C 5/00
(Continued)

OTHER PUBLICATIONS

Becker Patent Family List.
EmiTec Patent Family List.

*Primary Examiner* — Theresa Trieu
(74) *Attorney, Agent, or Firm* — Dickinson Wright PLLC

(57) ABSTRACT

Pump device has pump housing with annular portion; a deformable pump ring that defines annular pump chamber; a first connection and a second connection in fluid communication with the-pump chamber; an eccentric rotatable relative to the pump housing and arranged such that the eccentric deforms the-pump ring and pump ring presses against the annular to pump fluid along the-pump chamber from the-first to the-second connection depending on the current rotational position of the eccentric. A clamping element presses the-pump ring against the-annular portion of the pump housing in a clamping link region. The pump ring has at least one recess for accommodating at least part of the
(Continued)

clamping element and is dimensioned to provide a distance between the radially inner side of the clamping element and the-pump ring.

21 Claims, 14 Drawing Sheets

(51) Int. Cl.
*F04C 5/00* (2006.01)
*F16C 19/54* (2006.01)

(52) U.S. Cl.
CPC ...... *F04C 2240/30* (2013.01); *F04C 2240/50* (2013.01); *F16C 2360/44* (2013.01)

(58) Field of Classification Search
USPC .................. 418/54, 126–128, 152–153, 156
See application file for complete search history.

(56) References Cited

U.S. PATENT DOCUMENTS

| | | | | |
|---|---|---|---|---|
| 4,332,534 A | 6/1982 | Becker | ............................ | 418/45 |
| 5,787,563 A * | 8/1998 | Jenkins | ................ | B23D 19/065 |
| | | | | 29/417 |
| 7,476,080 B2 * | 1/2009 | Sato | ........................ | B25C 65/74 |
| | | | | 29/525.14 |
| 8,661,686 B2 * | 3/2014 | Oishi | .................... | F04B 1/0417 |
| | | | | 148/659 |
| 9,453,507 B2 | 9/2016 | Ghodsi-Khameneh | ...................... | |
| | | | | F04C 14/04 |
| 9,752,484 B2 | 9/2017 | Brueck | ...................... | F01N 3/20 |
| 2010/0284837 A1 * | 11/2010 | Ring | ...................... | F04B 17/046 |
| | | | | 417/410.1 |
| 2014/0017094 A1 | 1/2014 | Ghodsi-Khameneh | ...................... | |
| | | | | F04C 14/04 |
| 2016/0146078 A1 | 5/2016 | Brueck | ...................... | F01N 3/20 |

FOREIGN PATENT DOCUMENTS

| | | | | |
|---|---|---|---|---|
| DE | 102011-015110 A | 2/2012 | ............. | F04D 15/00 |
| DE | 102013-104245 A | 10/2014 | ................ | F04C 5/00 |
| GB | 2037371 A | 7/1980 | ................ | F04C 5/00 |
| WO | WO 2012-126544 A | 1/2014 | ................ | F04B 13/00 |
| WO | WO 2014-198498 A | 12/2014 | ............. | F04B 43/12 |

\* cited by examiner

PUMP DEVICE

BACKGROUND

1. Field

The invention relates to a pump device for pumping a fluid.

2. Description of Related Art

A pump device or pump is understood here to mean a machine which serves to transport fluids. These also include fluid-solid mixtures, pastes and fluids with a slight gas content. During operation of the pump device, the work of the drive is converted into the kinetic energy of the transported fluid.

The illustrated pump device is also referred to as an orbital pump, rotary diaphragm pump or peristaltic pump.

The pump device can be used to transport a fluid from a reservoir, for example a tank, into a desired environment, for example into an exhaust system of an internal combustion engine.

Known from the publication DE 10 2013 104 245 A1 is a pump device which is configured as an orbital pump which has a pump housing with at least one inlet and at least one outlet, wherein an eccentric is arranged on the pump housing so as to be rotatable relative to the pump housing. An electric drive is provided in order to move the eccentric. Arranged between the eccentric and the pump housing is a deformable diaphragm which, together with the pump housing, delimits a delivery path from the at least one inlet to the at least one outlet and forms at least one seal of the delivery path. The at least one seal is displaceable, through a movement of the eccentric, in order to deliver the fluid along the delivery path.

The publication WO 2012/126544 A1 describes a metering system for metering a liquid with a pump device which is equipped with an eccentric drive which can be driven by an electric motor. The pump device, which has two delivery directions, has a pump ring and a stationary ring which is arranged, relative to the pump ring and to the eccentric drive, in such a way that a pump chamber is formed between the stationary ring and the pump ring which changes shape upon rotation of the electric motor, in order to deliver a liquid to be metered through the pump chamber. The functional principle of an orbital pump is described in this publication.

SUMMARY

Against this background, a pump device with the features of the independent claims is presented. Embodiments thereof are disclosed in the dependent claims and in the description.

A pump device for pumping a fluid is presented herein. The pump device has a hydraulics housing in which a pump ring and an eccentric are accommodated, said eccentric being connected via a shaft with a drive in order to make possible a rotation of the eccentric via the drive and the shaft, said shaft defining an axial direction and a radial direction of the pump device, said hydraulics housing comprising an annular portion, a first lateral section and a second lateral section, said annular portion having a first axial side and a second axial side, said first lateral section being arranged on the first axial side and said second lateral section being arranged on the second axial side, said pump ring being arranged, at least in portions, between the first lateral section and the second lateral section, and said second lateral section serving as a drive flange for the drive.

The configuration of the second lateral section as a drive flange makes possible a simple centering and thus a simplified installation.

According to one embodiment, the annular portion has a first inner surface which is in contact with an outer surface of the first lateral section, and the annular portion has a second inner surface which is in contact with an outer surface of the second lateral section. This makes possible a secure connection of the sections with one another.

According to one embodiment, the first inner surface and the outer surface of the first lateral section are configured to limit a movement of the first lateral section relative to the annular portion in a radial direction, and the second inner surface and the outer surface of the second lateral section are configured to limit a movement of the second lateral section relative to the annular portion in a radial direction. This makes possible a guidance of the sections relative to one another during installation, and means that the hydraulics housing is stable following installation, which reduces the risk of a leak.

According to one embodiment, the first inner surface and the outer surface of the first lateral section are connected with one another by means of a first weld, and the second inner surface and the outer surface of the second lateral section are connected with one another by means of a second weld. This makes possible a good connection between the sections.

According to one embodiment, the first weld and the second weld are in each case provided over at least 70% of the circumference of the annular portion. Since the risk of a leak depends on the secure connection of the sections, this value range is advantageous.

According to one embodiment, the radially outer side of the annular portion is cylindrical in form in the axial region of the first weld and in the region of the second. This facilitates formation of the weld.

According to one embodiment, the first weld and the second weld are in each case created in the form of a laser weld. This type of weld can readily be carried out due to the configuration of the annular portion and the lateral sections.

According to one embodiment, the first lateral section comprises a first material in the region of the outer surface, the annular portion comprises a second material in the region of the first inner surface, and the first material exhibits a greater laser absorption than the second material, in order to make laser penetration welding possible. The choice of corresponding materials with different properties in terms of laser absorption makes it possible to use laser penetration welding.

According to one embodiment, the first inner surface, the second inner surface, the outer surface of the first lateral section and the outer surface of the second lateral section are made of plastic.

According to one embodiment, the pump device has a clamping element which is configured to statically press the pump ring against the annular portion of the pump housing in a clamping element region. Such a clamping element makes possible a simple sealing of a pump channel in the clamping element region.

According to one embodiment, a recess is provided on the inner side of the first lateral section, said recess being configured to accommodate the clamping element, at least partially, and thereby support it. The first lateral section thus performs an additional function, and the positioning of the first lateral section thus leads to a definition of the position of the clamping element.

According to one embodiment, the recess is configured in the manner of a blind hole, in order to prevent the escape of a fluid which is being transported.

According to one embodiment, a clamping element opening is provided on the inner side of the second lateral section, said clamping element opening being configured to accommodate the clamping element, at least partially, and thereby support it. The positioning of the second section on the annular portion thus also defines the position of the clamping element.

According to one embodiment, the clamping element opening is configured as a continuous opening, in order to make it possible to introduce the clamping element from the outer side of the second lateral section. Introduction from this side is advantageous, since the clamping element opening is, following installation, covered or protected on the side of the second lateral section by the drive.

According to one embodiment, at least one assembly means with an assembly opening is provided on the annular portion, said assembly opening extending in a first assembly opening alignment direction in order to make possible assembly of the pump device. The provision of the assembly opening on the annular portion makes it possible to hold the annular portion, which contains important parts, securely. Two, three or more assembly means can also be provided.

According to one embodiment, at least one assembly means is formed as a lug on the circumference of the annular portion.

According to one embodiment, at least one assembly means with an assembly opening is provided on the second lateral section, said assembly opening extending in a second assembly opening alignment direction, in order to make possible assembly of the pump device. The provision of such an assembly means on the second lateral section is particularly advantageous if the second lateral section is also implemented as a drive flange and therefore supports at least one part of the drive.

According to one embodiment, the first assembly opening alignment direction and the second assembly opening alignment direction are parallel to one another. This allows the pump device, in the assembled state, to be fixed in place in a linear movement, for example in the vicinity of an internal combustion engine.

According to one embodiment, the second lateral section has a tubular region, through which tubular region the shaft extends, at least in part. Such a tubular region makes it easier to fasten a part of a drive on the tubular region, and still allows the use of a shaft.

According to one embodiment, the drive has a stator arrangement, said stator arrangement being attached to the tubular region of the second lateral section. As a result, following alignment of the second lateral section on the annular portion, the tubular region and thus the stator arrangement are also aligned, and further centering steps are unnecessary.

According to one embodiment, the second bearing is implemented as a roller bearing with an inner ring and an outer ring, and the eccentric lies against the inner ring of the second bearing. This makes possible an installation in which the shaft is pressed into the eccentric and possibly also into the second bearing.

According to one embodiment, the second lateral section has a shoulder, said shoulder being designed to limit a movement of the second bearing in an axial direction towards the shoulder, wherein a sealing ring is provided between the shoulder and the second bearing, the inner diameter of which is greater than the inner diameter of the second bearing. Such a sealing ring makes it possible to manufacture the second lateral section by means of an injection molding method, and the second bearing is hereby protected through the sealing ring.

According to one embodiment, the second lateral section has a tubular region, and the inner diameter of the sealing ring is smaller than the inner diameter of the tubular region. This makes it possible to achieve a good seal where an injection molding method is used to manufacture the second lateral section, since the injection mold can lie axially against the sealing ring in the region of the shoulder.

According to one embodiment, the first bearing is configured as a floating bearing and the second bearing is configured as a fixed bearing. This design makes possible simple and secure installation.

According to one embodiment, the eccentric bearing is axially displaceable relative to the eccentric. This decouples the eccentric bearing and thus also the pump ring from an axial displacement of the shaft, and the pump ring can thus work in an axial direction under defined conditions.

According to one embodiment, the second bearing is configured as a needle bearing. Such a needle bearing makes possible an axial displacement of the eccentric relative to the needle bearing.

According to one embodiment, the eccentric bearing has a lesser axial dimension than the eccentric. This means that the eccentric bearing can move in an axial direction, relative to the eccentric, without the eccentric bearing slipping down from the eccentric.

According to one embodiment, the pump ring is in contact with the first lateral section and the second lateral section. This makes it possible to apply pressing forces onto the pump ring and to thus achieve a good seal.

According to one embodiment, a pump ring support is provided in the hydraulics housing.

According to one embodiment, the annular portion of the hydraulics housing has a first collar through which the first lateral section of the hydraulics housing is held in a radial direction of the shaft. The inner surface which interacts with an outer surface of the first lateral section can be provided on the first collar.

According to one embodiment, the annular portion of the hydraulics housing has a second collar through which the second lateral section of the hydraulics housing is held in a radial direction of the shaft. The inner surface, which interacts with an outer surface of the second lateral section, can be provided on the second collar.

According to one embodiment, a funnel is provided for installation of the pump ring in the annular portion. The funnel has a first axial end and a second axial end opposite the first axial end. The funnel narrows on the inner side from the first end to the second end, at least in portions, in order to effect a radial compression of the pump ring when the pump ring is pushed into the funnel towards the second end, so that it can slide against the inner region of the annular portion in the radially compressed state.

According to one embodiment, the second end of the funnel is so small that the funnel fits at least partially into the annular portion, so that the second end can be arranged in the vicinity of the radially inner region of the pump ring. This more effectively prevents the pump ring from expanding before it reaches the target position.

Further advantages and variants of the invention are disclosed in the description and the enclosed drawing.

It should be understood that the aforementioned features, and those which will be explained in the following, can be used not only in the combination stated in each case, but also in other combinations or on their own, without departing from the scope of the present invention.

BRIEF DESCRIPTION OF THE DRAWINGS

The invention is represented schematically in the drawings with reference to various embodiments and will be described schematically and in detail with reference to the drawings, wherein.

DETAILED DESCRIPTION

Figure 1:
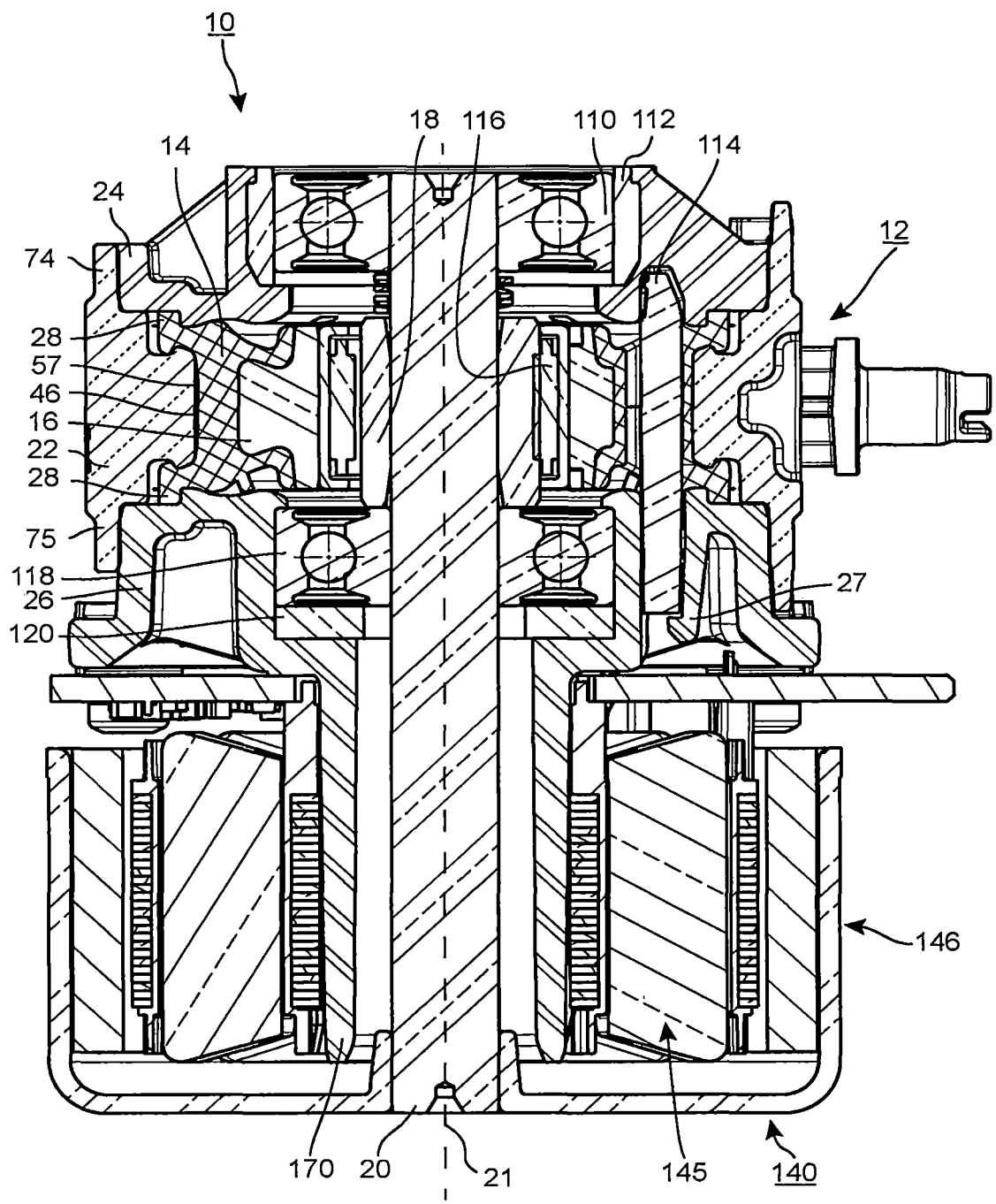
FIG. 1 shows a sectional view of an embodiment of the described pump device.

FIG. 1 shows a sectional view of an embodiment of the described pump device, which is identified as a whole with the reference number 10 and is implemented as an orbital pump. The illustration shows a hydraulics housing 12, a pump ring 14, a pump ring support 16, an eccentric 18, a shaft 20, a drive 140, a first bearing 110, a second bearing 118, a bushing or socket 112, which can also be described as a ring 112, a clamping element 114, which can also be described as a separating chamber pin, an eccentric bearing 116, and a sealing ring 120, which can also be described as a gasket 120.

In this embodiment, the first bearing 110 is installed as a floating bearing, and the second bearing 118 as a fixed bearing. This provides a good mounting.

A needle bearing can be used as the eccentric bearing 116. This has a short extent in a radial direction. Other bearing types, for example roller bearings, are also possible. The eccentric bearing 116 makes possible a low-friction transmission of forces between the rotating eccentric 18 and the rotationally-fixed pump ring 14 or pump ring support 16.

The hydraulics housing 12 comprises an annular portion 22 and a first lateral section 24, which can also be described as a pump cover, and a second lateral section 26, which can also be described as a motor flange or drive flange. The two lateral sections 24, 26 are arranged opposite one another. The pump ring 14 thereby lies, at least in portions thereof, between the two lateral sections 24, 26 of the hydraulics housing 12. The annular portion 22 has a first collar 74 and a second collar 75.

The drive 140 has a stator arrangement 145 and a rotor arrangement 146. The drive 140 is partially attached to a tubular region 170 of the second lateral section 26.

The pump housing 12 has a snap-locking element 27, which is designed to snap into engagement, upon introduction of the clamping element 114 into the pump housing 12 and to secure the clamping element 114 axially. The introduction of the clamping element 114 can take place before the installation of the drive 140.

The pump ring 14 is deformable and can be made of an elastomeric material or another deformable material.

Figure 2:
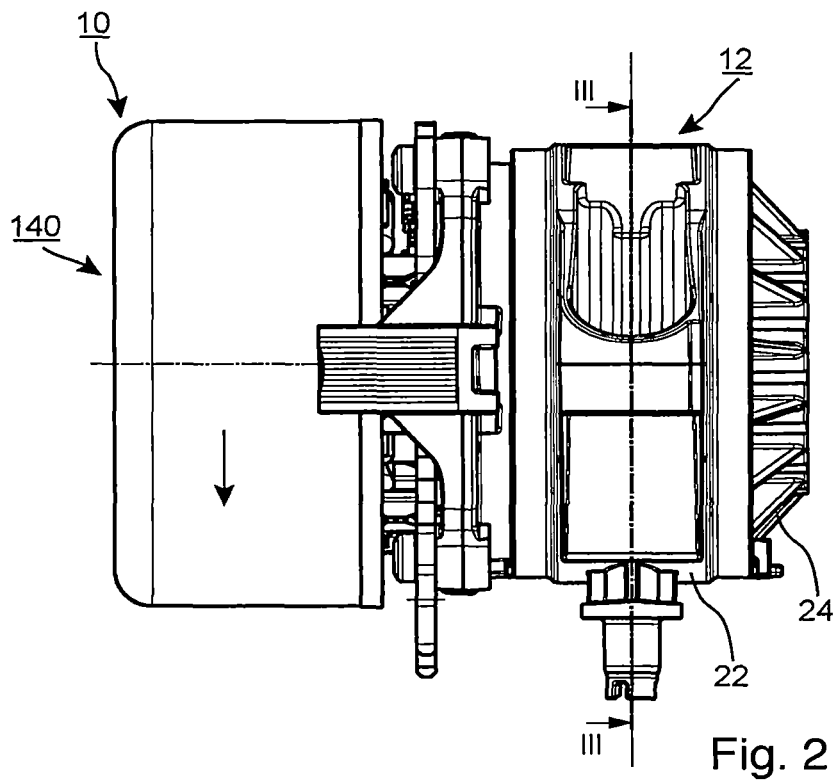
FIG. 2 shows a side view of the pump device from FIG. 1.

FIG. 2 shows a side view of the pump device 10 shown in FIG. 1.

Figure 3:
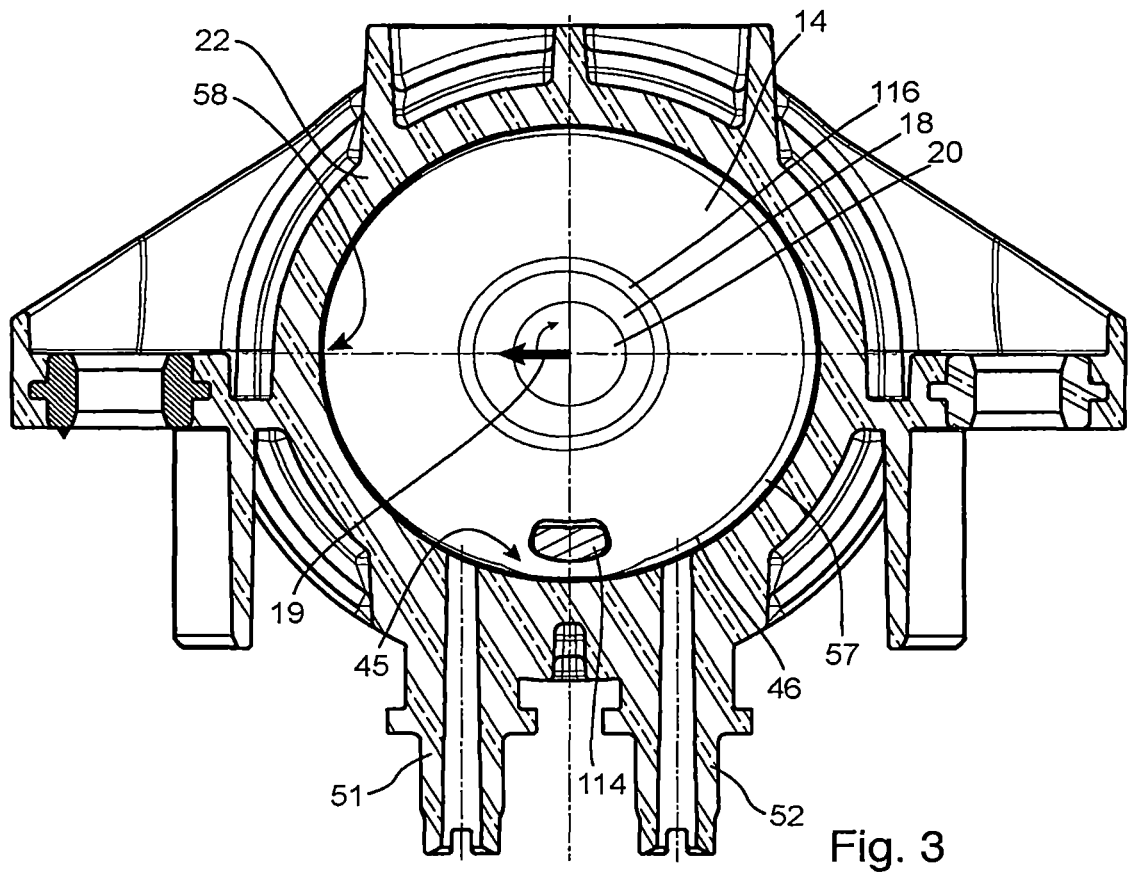
FIG. 3 shows a sectional view of the pump device from FIG. 1.

FIG. 3 shows a cross section through the pump device 10, viewed along the section line III-III shown in FIG. 2. A first connection 51 and a second connection 52 are provided, and these connections 51, 52 are in fluid communication with a pump chamber 57 which is formed between the annular portion 22 of the hydraulics housing and a contact surface 46 of the pump ring and in the illustration shown in FIG. 3 extends in an annular manner from the first connection 51 in a clockwise direction up to the second connection 52. In the section which extends from the first connection 51 in an anticlockwise direction up to the second connection 52, the pump chamber 57 is deactivated through the clamping element 114 in that the clamping element 114 presses the contact surface 46 of the pump ring 14 statically against the annular portion 22 of the hydraulics housing 12, thus preventing or at least greatly reducing a fluid flow through this section. The region in which the clamping element 114 presses the contact surface 46 of the pump ring 14 against the annular portion 22 is also referred to in the following as the "clamping element region" 45.

The illustration depicts the interior of the hydraulics housing 12 schematically and in an exaggerated manner, in terms of the deformation of the pump ring 14, in order to explain the principle.

The functional principle of the orbital pump is described in the following with reference to FIG. 1 and FIG. 3.

The eccentric 18 sits on the shaft 20 and is driven by this. The drive 140, typically a motor or electric motor, serves in turn to drive the shaft 20. According to one embodiment, a controllable drive 140 is provided as a drive 140.

The shaft 20 is thereby rotated around its longitudinal axis 21, which defines an axial direction of the pump device 10. The eccentric 18 is thus also moved around the longitudinal axis of the shaft 20 in a rotational movement. This movement of the eccentric 18 is transmitted via the bearing 116 and via the pump ring support 16 to the pump ring 14. The pump ring support 16 and the pump ring 14 are rotationally fixed relative to the hydraulics housing 12, but depending on the rotational position of the eccentric 18 they are moved locally closer to or further away from the annular portion 22. In FIG. 3, the eccentric 18 points in a direction indicated with an arrow 19, pointing to nine o'clock in the example illustrated, i.e. the region of the eccentric 18 with the greatest radial extent or dimension points in the direction of the arrow 19. This causes the pump ring 14 to be moved in this direction 19 and pressed against the annular portion 22 in the region 58. As a result, the pump channel 57 is narrowed or completely blocked in the region 58.

If the eccentric now rotates in a clockwise direction, the point 58 at which the pump ring 14 is pressed against the annular portion 22 also travels along in a clockwise direction, and as a result the fluid in the pump chamber 57 is pumped or transported in a clockwise direction from the first connection 51 to the second connection 52. A hydraulic short circuit in which the fluid passes from the second connection 52 in a clockwise direction to the first connection 51 is prevented through the clamping element 114 or another interruption of the pump chamber 57 in this region.

The pump device 10 also functions in the reverse direction, in that the direction of rotation of the eccentric 18 is reversed.

Assembly of the Pump Device

The assembly of the pump device is described step by step in the following.

Annular Portion

Figure 4:
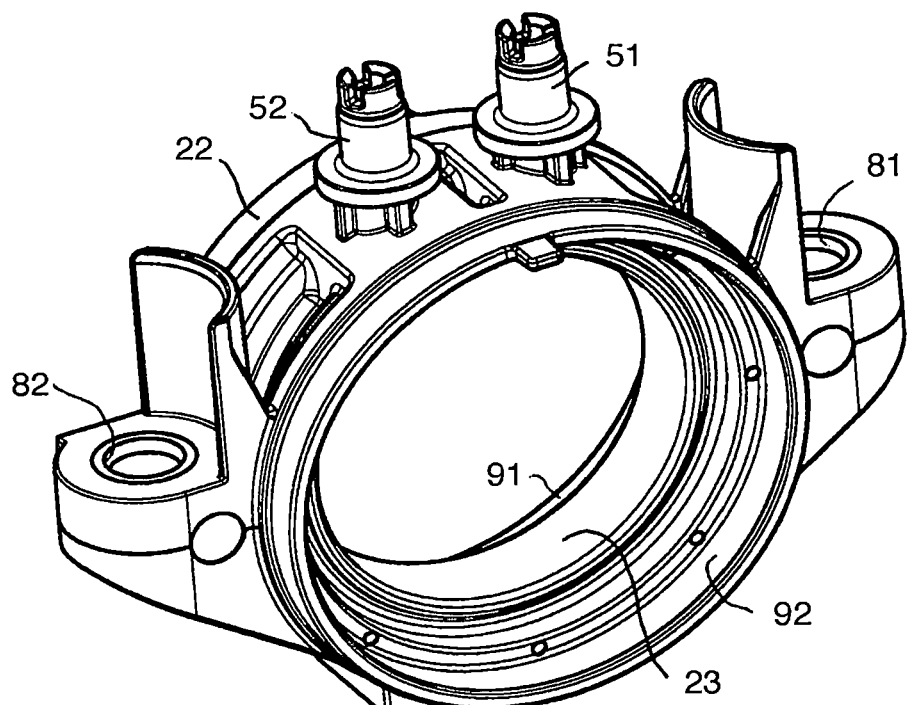
FIG. 4 shows a three-dimensional representation of an annular portion of the hydraulics housing from FIG. 1.

FIG. 4 shows the annular portion 22 of the hydraulics housing 12, which can also be described as an annular component 22. The first connection 51 and the second connection 52 are arranged on the annular portion 22. Two assembly means 184, 185 with in each case at least one assembly opening 81, 82 are provided on the outer side of the annular portion 22, said assembly means 184, 185 being designed to enable the pump device 10 to be fastened in place by means of a—not shown—screw or bolt.

A surface 23 is provided on the inner side of the annular portion 22 which serves to limit an outward movement of the pump ring 14 and as a result makes possible a deformation of the pump ring 14.

Figure 5:
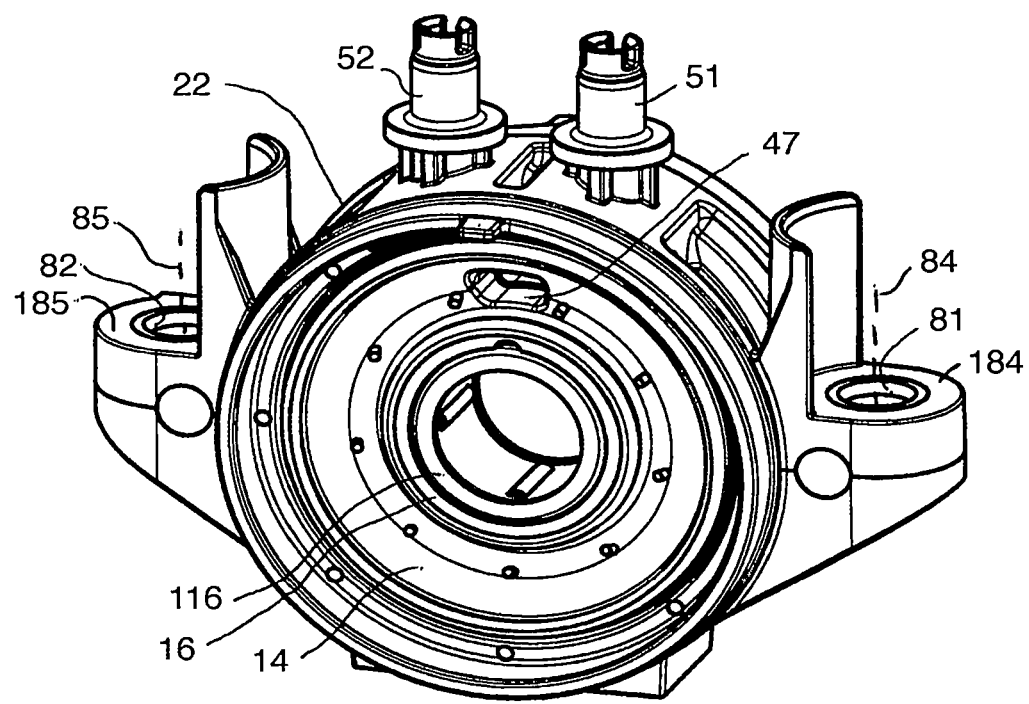
FIG. 5 shows a three-dimensional representation of the annular portion from FIG. 4 with pump ring and eccentric bearing mounted therein.

FIG. 5 shows the annular portion 22 following fitting of the diaphragm 14 and the subsequent installation of the eccentric bearing 116. As can be seen in FIG. 1, the maximum radial dimension of the pump ring 14 is greater than the minimum radial dimension of the annular portion 22. The pump ring 14 is therefore preferably compressed during installation, and the pump ring 14 can expand again radially after reaching the target position. In the case of optional use of the pump ring support 16 this is introduced into the annular portion 22 together with the pump ring 14.

The installation of the eccentric bearing 116 preferably takes place following installation of the pump ring 14, but can also take place at the same time.

A needle bearing can preferably be used as the eccentric bearing 116, as shown. The use of a needle bearing has the advantage that the needle bearing 116 can be displaced axially on the eccentric 18 by means of the needles. As a result, in the event of an axial movement of the shaft 20 no axial forces are transmitted to the pump ring 14, and this can assume its form independently of the axial position of the shaft 20. As a result, the pumping performance of the pump device 10 is improved, and the risk of an external leak, i.e. an undesired leak from the pump chamber, is reduced.

In the exemplary embodiment, the eccentric bearing 116 has a lesser axial dimension than the eccentric 18. In the event of an axial displacement of the shaft 20 and thus of the eccentric 18, this makes it possible for the eccentric bearing, with an axial displacement relative to the eccentric 18, to continue to lie against the eccentric 18 over its entire axial dimension, i.e. it does not slip down from this.

A recess 47 of the pump ring 14 running in an axial direction is arranged between the first connection 51 and the second connection 52 and serves to accommodate the clamping element 114.

An assembly opening alignment direction 84 of the assembly opening 81 and an assembly opening alignment direction 85 of the assembly opening 82 are indicated in the drawing and, in the exemplary embodiment, run parallel to one another, in order to facilitate installation.

Figure 6:
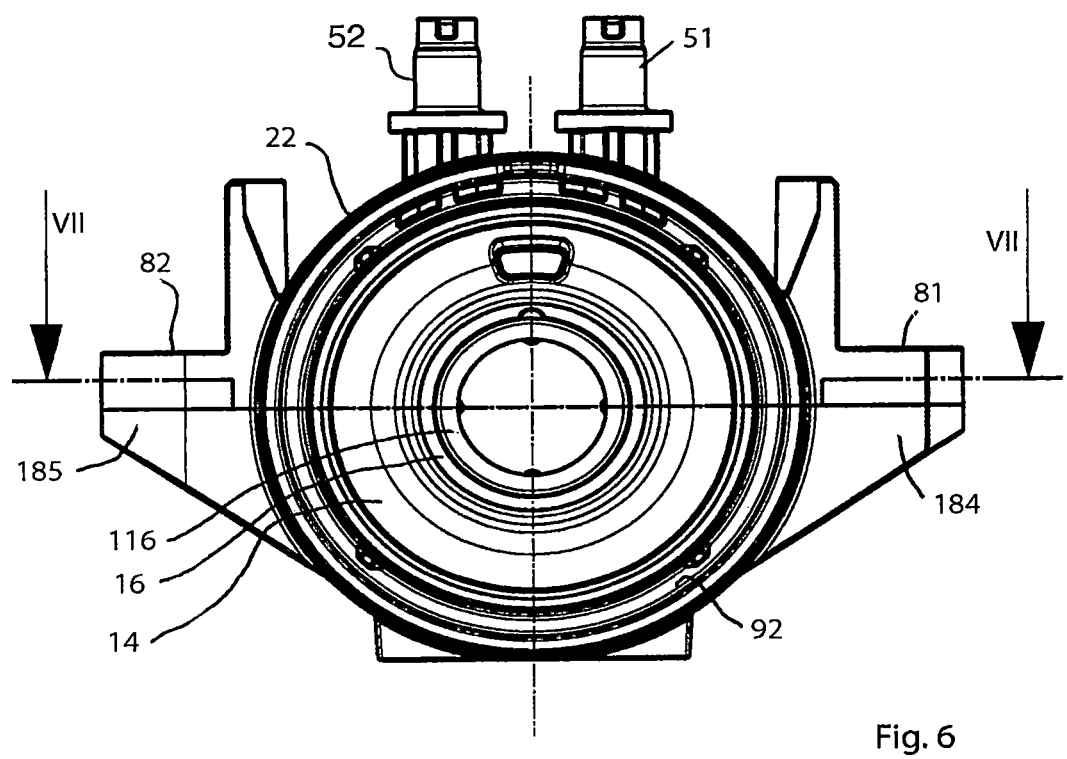
FIG. 6 shows a side view of the annular portion from FIG. 5.
Figure 7:
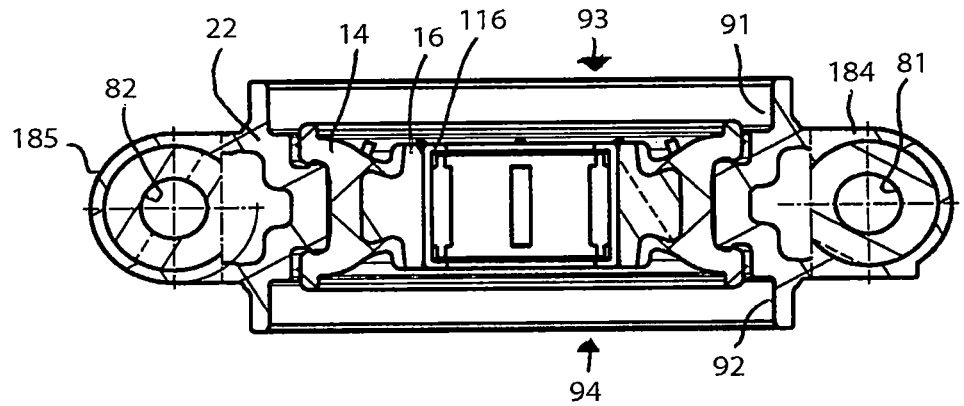
FIG. 7 shows a longitudinal section through the annular portion from FIG. 6.

FIG. 6 shows a side view of the annular portion 22 shown in FIG. 5, and FIG. 7 shows a corresponding section along the section line VII-VII shown in FIG. 6. In FIG. 7, it can be seen how the pump ring 14 is arranged on the annular portion 22, and the eccentric bearing 116 is pushed into the pump ring 14 or into the pump ring support 16.

The annular portion 22 has a first axial side 93 and a second axial side 94.

The annular portion 22 has a first inner surface 91 on the first axial side 93 and a second inner surface 92 on the second axial side 94. The first inner surface 91 and the second inner surface 92 are preferably circular in cross section, wherein asymmetries can be provided in order to form an index for correct installation. The first inner surface 91 and the second inner surface 92 can also have a different cross section, for example an oval cross section or a polygonal cross section.

First Lateral Section

Figure 8:
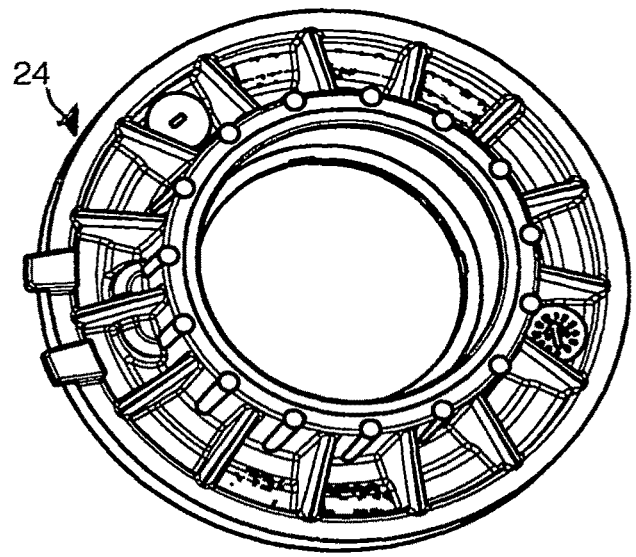
FIG. 8 shows a three-dimensional representation of an outer side of a first lateral section of the hydraulics housing from FIG. 1.
Figure 9:
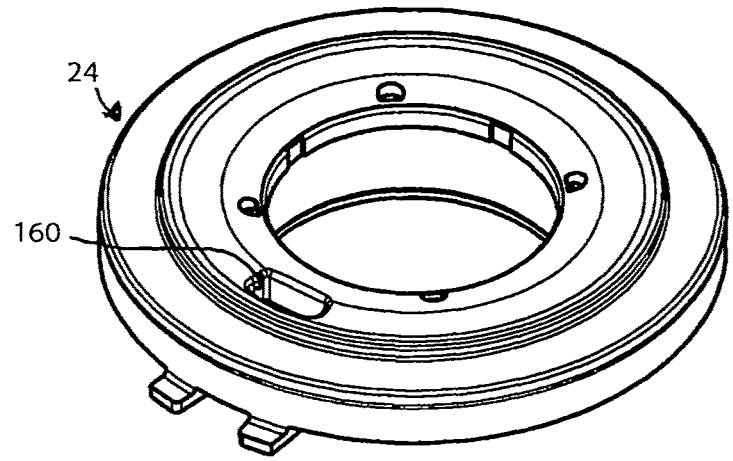
FIG. 9 shows a three-dimensional representation of an inner side of the first lateral section from FIG. 8.

FIG. 8 shows the first lateral section 24 of the hydraulics housing 12 from outside, i.e. from the side facing away from the pump ring 14. FIG. 9 shows the first lateral section 24 from inside. The first lateral section 24 can also be described as a first lateral component 24.

A recess 160 is provided on the inner side of the first lateral section 24, and this recess 160 serves to accommodate a region of the clamping element 114 in order to support this clamping element 114. The recess 160 is preferably formed in the manner of a blind hole, i.e. it does not pass completely through the first lateral section. As a result, no leak can occur in this region.

Figure 10:
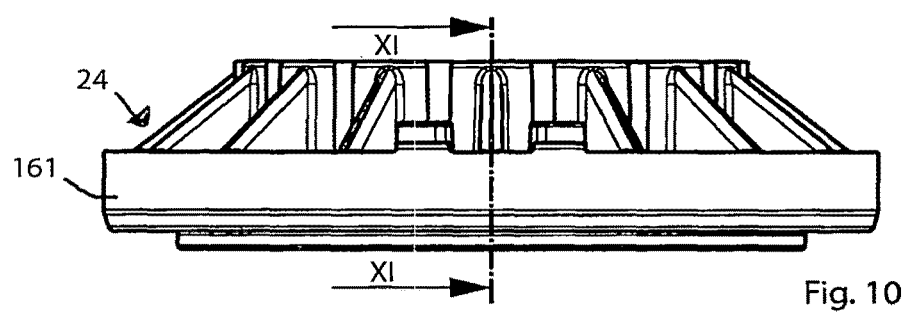
FIG. 10 shows a side view of the first lateral section from FIG. 8.

FIG. 10 shows a side view of the first lateral section 24, and the first lateral section 24 has an outer surface 161 which is preferably intended to serve as a mating surface to the inner surface 91 of the annular portion 22. The outer surface 161 preferably has a form which is at least largely complementary to the inner surface 91.

Figure 11:
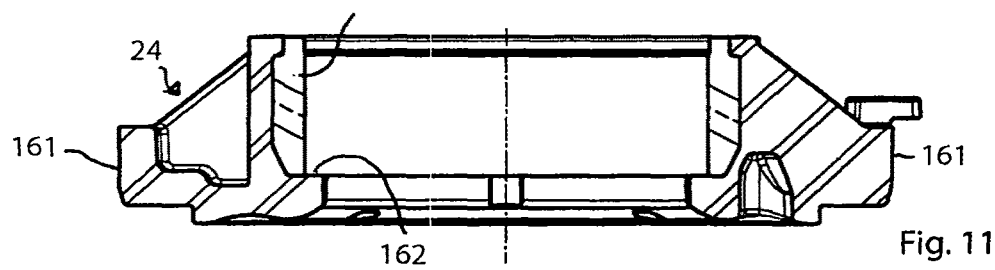
FIG. 11 shows a longitudinal section through the first lateral section from FIG. 8.

FIG. 11 shows a section through the first lateral section 24 along the line XI-XI shown in FIG. 10. The socket 112, which can also be described as a ring 112, preferably serves to fix in place the first bearing 110, see FIG. 1. The socket 112 can be made of a harder material than other regions of the first lateral section 24, for example of a metal or a hard plastic. In the exemplary embodiment, the first lateral section 24 is formed by means of a plastic injection molding method, wherein the socket 112 can be laid in the injection mold as an insert.

Second Lateral Section

Figure 12:
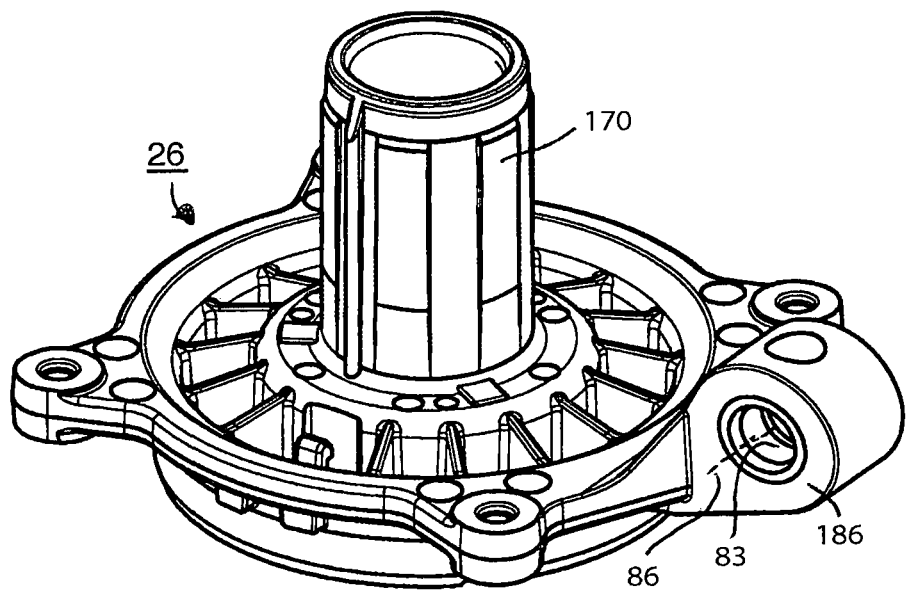
FIG. 12 shows a three-dimensional representation of an outer side of a second lateral section of the hydraulics housing from FIG. 1.
Figure 13:
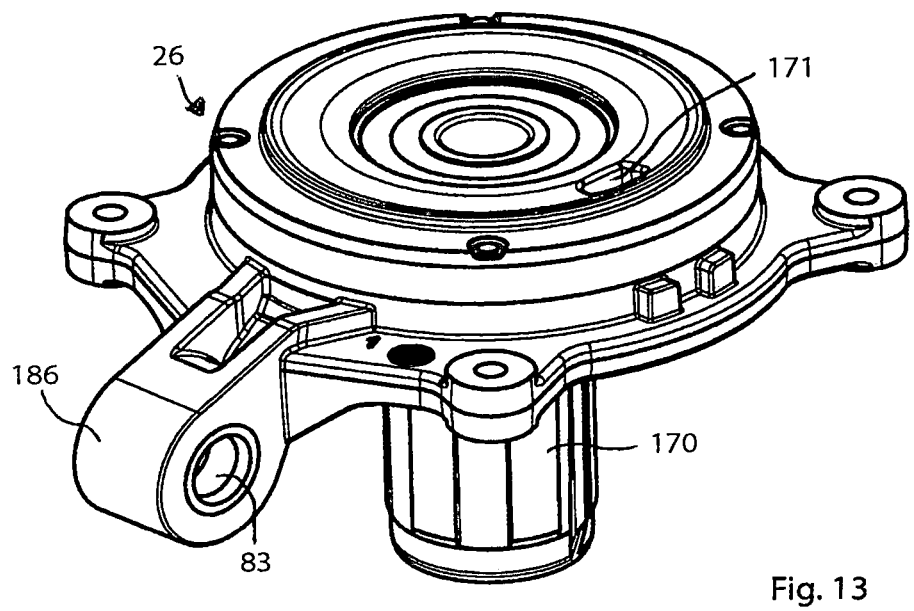
FIG. 13 shows a three-dimensional representation of an inner side of the second lateral section from FIG. 12.

FIG. 12 shows the second lateral section 26 of the hydraulics housing 12 from the outer side, i.e. from the side facing away from the pump ring 12, and FIG. 13 shows the second lateral section 26 from the inner side. The second lateral section 26 can also be described as a second lateral component 26.

In this exemplary embodiment, the second lateral section 26 is at the same time designed to serve as a drive flange, that is to say it supports the drive 140 shown in FIG. 1, at least partially. Preferably, the second lateral section 26 has a tubular region 170 in order to make possible a support and good installation of the drive 140. The tubular region 170 can also be described as a tubular flange 170.

As can be seen in FIG. 1, in this exemplary embodiment the drive 140 has a stator arrangement 145 and a rotor arrangement 146, and the stator arrangement 145 is fixed on the tubular region 170. This is a design with an external rotor motor as a drive 140; however, other drives 140, for example internal rotor motors, are possible.

A third assembly means 186 with an assembly opening 83 is preferably provided on the second lateral section 26 in order also to make possible a fastening of the pump device 10 in the region of the second lateral section 26. This makes possible an improved absorption of forces into the pump device 10, and the connection between the annular portion 22 and the second lateral section 26 is subjected to less stress. An assembly opening alignment direction 86 of the assembly opening 83 is indicated in the drawing.

In FIG. 13, a clamping element opening 171 can be seen on the inner side of the second lateral section 26 which is provided in order to at least partially accommodate the clamping element 114 (see FIG. 1) and to support the same. In the exemplary embodiment, the clamping element opening 171 is designed as a continuous opening in order to make it possible to introduce the clamping element 114 from the outer side of the second housing section 26.

Figure 14:
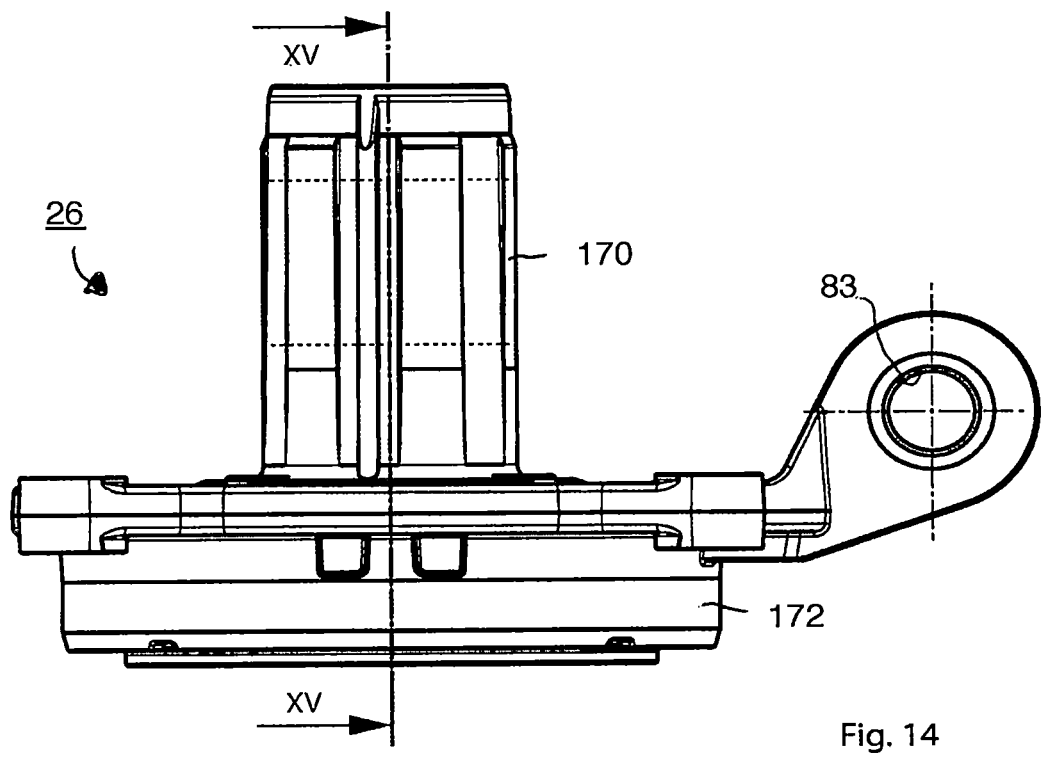
FIG. 14 shows a side view of the second lateral section from FIG. 12.
Figure 15:
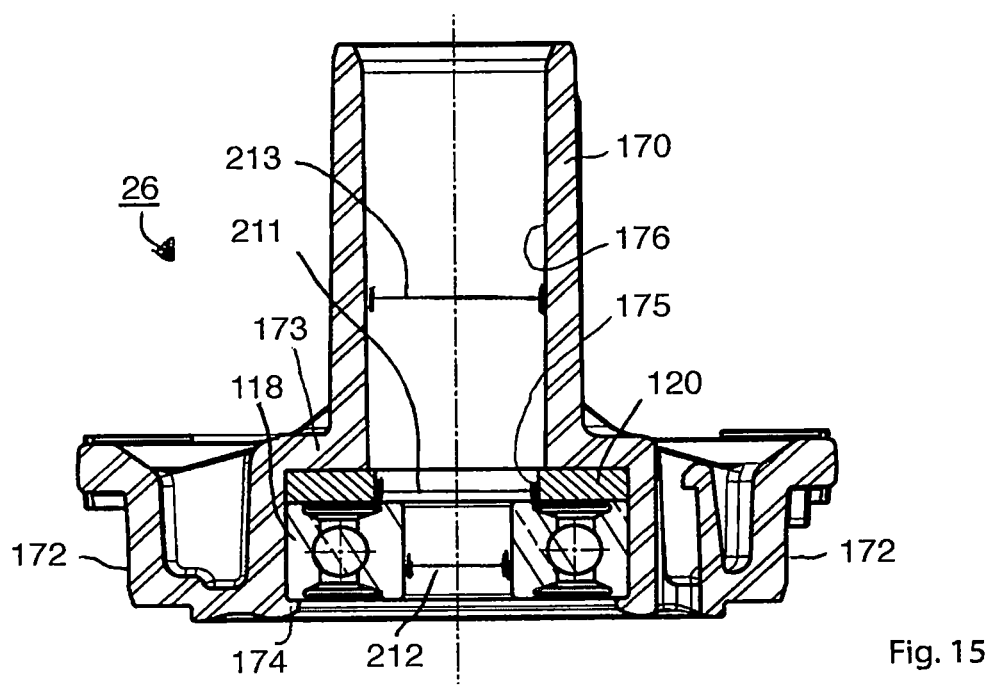
FIG. 15 shows a longitudinal section through the second lateral section from FIG. 12.

FIG. 14 shows a side view of the second lateral section 26, and FIG. 15 shows a longitudinal section through the second lateral section 26 along the line XV-XV shown in FIG. 14.

As can be seen in FIG. 15, the second bearing 118 is fixed in the second lateral section 26. Preferably, the sealing ring 120 is provided, which at least partially covers an axial side of the second bearing 118.

In the embodiment, the inner diameter 211 of the inner side 175 of the sealing ring 120 is greater than the inner diameter 212 of the inner side of the second bearing 118. This makes it possible, when pressing in the shaft 20, to support the second bearing 118 axially, by means of a tool inserted between the shaft 20 and the sealing ring 120, as described below in connection with the installation of the shaft.

Where the second bearing 118 is designed as a roller bearing with inner ring and outer ring, as shown in the exemplary embodiment, the inner diameter 211 of the sealing ring 120 is preferably so large that the sealing ring 120 does not come into contact with the inner ring of the bearing 118, in order to prevent abrasion and friction.

In the exemplary embodiment, the inner diameter 211 of the inner side 175 of the sealing ring 120 is less than the inner diameter 213 of the inner side 176 of the tubular region 170. This makes it possible to manufacture the second lateral section 26 using a plastic injection molding method, and the sealing ring 120 thereby protects the second bearing 118 from the injected plastic. The lower side of the second bearing 118, as seen in FIG. 15, can be protected by means of a—not shown—injection mold; however, this is not possible in the case of the upper side of the second bearing 118, as seen in FIG. 15, since a stamp (not shown) of the injection mold applied to the second bearing 118 from above could not be withdrawn upwards following the injection molding, or this would require a very complicated and expensive injection mold. The provision of the sealing ring 120 solves this problem in that the upper side of the second bearing 118, as seen in FIG. 15, is effectively covered and protected from the outset by the sealing ring 120.

In this exemplary embodiment, the second lateral section 26 has a first shoulder 173 and a second shoulder 174, and the shoulders 173, 174 lead to a firm connection of the second bearing 118 in the second lateral section 26. Other fastening options are also possible, for example adhesive bonding of the second bearing 118 or replacing the second shoulder 174 with a further component which is to be connected with the second lateral section 26.

Installation of the Sections of the Hydraulics Housing

Figure 16:
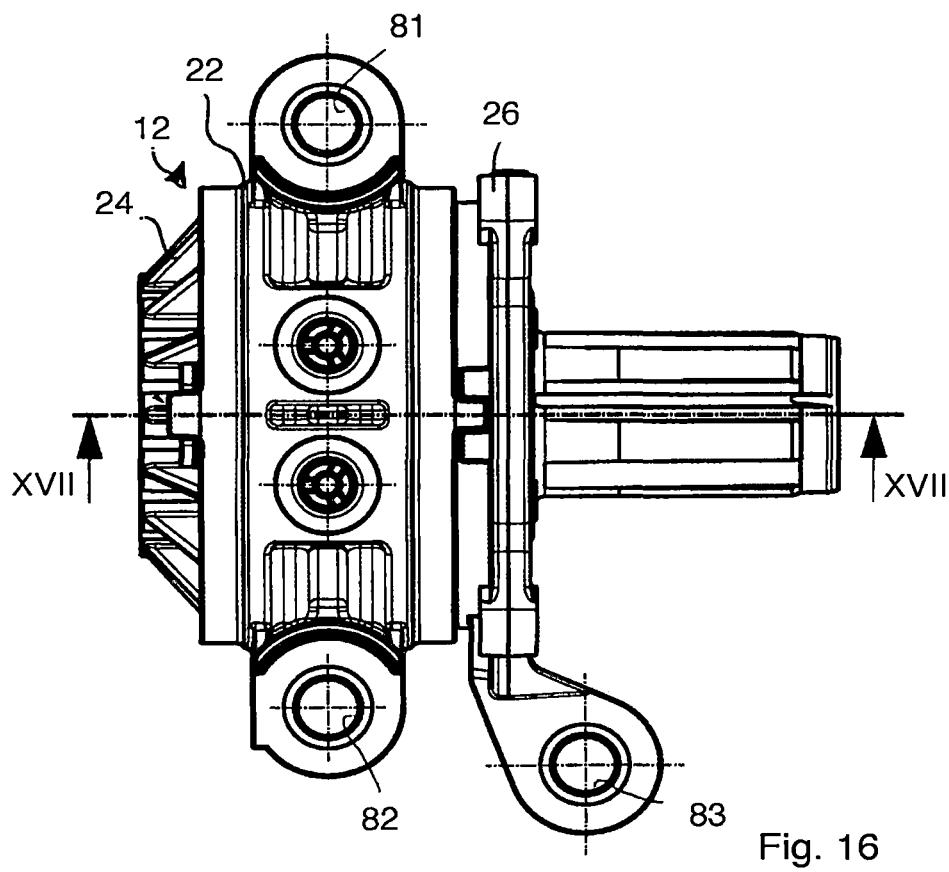
FIG. 16 shows a side view of the hydraulics housing with the annular portion and with the first lateral section and second lateral section mounted thereon.

FIG. 16 shows the hydraulics housing 12 following installation of the first lateral section 24 on the first axial side 93 and of the second lateral section 26 on the second axial side 94 of the annular portion 22. The first lateral section 24 and the second lateral section 26 lie opposite one another, and the pump ring 14 is arranged between them.

In the exemplary embodiment, the assembly opening 82 of the annular portion 22 and the assembly opening 83 of the second lateral section 26 are oriented parallel following installation, and this facilitates the attachment of the pump device 10 in that the assembly openings 82, 83 can be pushed onto fastening means, for example screws or cylindrical connection pieces, at the same time. Preferably, the assembly opening 81 of the annular portion 22 is also oriented parallel to the assembly openings 82, 83, i.e. the assembly openings 81, 82, 83 extend parallel to one another.

Figure 17:
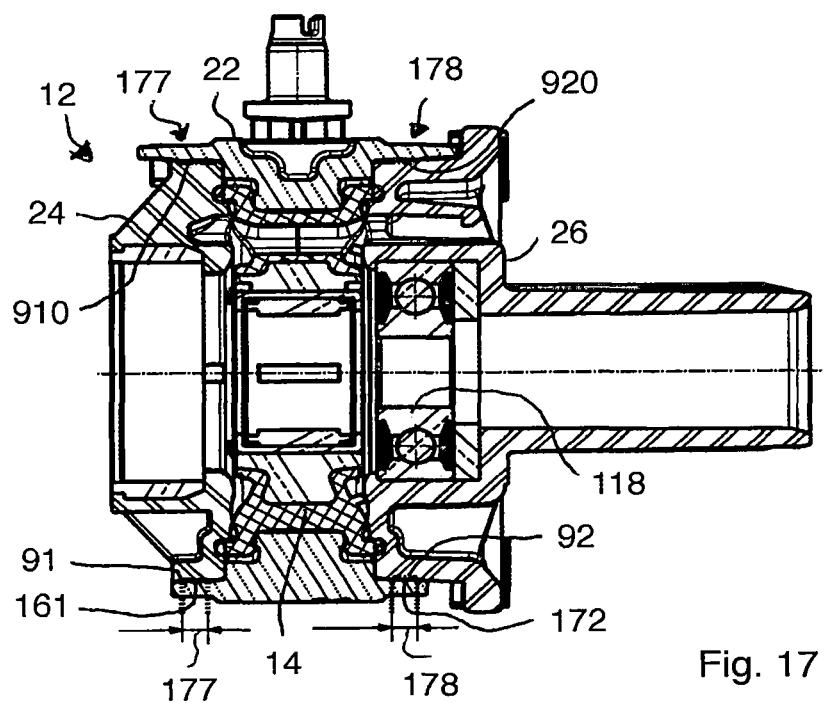
FIG. 17 shows a longitudinal section through the hydraulics housing from FIG. 16.

FIG. 17 shows a section through the hydraulics housing 12 along the line XVII-XVII shown in FIG. 16. The outer surface 161 of the first lateral section 24 lies against the first inner surface 91 of the annular portion 22 after the first lateral section 24 has been inserted, in an axial direction, into the annular portion 22. The outer side 172 of the second lateral section 26 lies against the second inner side 92 of the annular portion 22 after the second lateral section 26 has been pushed, in an axial direction, partially into the annular portion 22. The first inner side 91 and the second inner side 92 of the annular portion 22 thereby act as a guide for the first lateral section 24 or the second lateral section 26, and the lateral sections 24, 26 can in each case be inserted into the annular portion 22 as far as a limit stop. In the embodiment shown in FIG. 17, a first axial region 177 and a second axial region 178 are indicated in the drawing, and a fixed connection between the annular portion 22 and the first lateral section 24 can be achieved through a weld 910 in the region 177 and, accordingly, a fixed connection between the annular portion 22 and the second lateral section 26 can be achieved through a weld 920 in the axial section 178. The weld 910 in the axial region 177 or the weld 920 in the axial region 178 is preferably provided around the entire circumference, i.e. over 360°, in order to make possible a good connection between the sections or components. The welds 910, 920 can also contain interruptions, wherein according to one embodiment the welds 910, 920 are in each case provided over at least 70% of the circumference. The weld is preferably created in the form of a laser weld.

A good and secure assembly is achieved through the use of a laser penetration welding method in which a laser beam passes through the annular portion 22 to strike the first lateral section 24 or the second lateral section 26 where it causes the material to heat up and thus a weld to be formed.

For this purpose, the first lateral section 24 can comprise a first material in the region of the outer surface 161, the annular portion 22 can comprise a second material in the region of the first inner surface 91, wherein the first material makes possible, or possesses as a material property, a greater laser absorption than the second material. This facilitates the laser welding in these regions.

Particularly suitable for creating a weld is the use of plastic for the first inner surface 91, the second inner surface 92, the outer surface 161 of the first lateral section 24 and the outer surface 172 of the second lateral section 26.

The pump ring 14 is represented in FIG. 17 in the original state, and in this original state it overlaps both with the annular portion 22 and also with the first lateral section 24 and second lateral section 26. Since, in the exemplary embodiment, these housing sections 22, 24, 26 are harder than the pump ring 14, the pump ring 14 is compressed during installation, i.e. it conforms to the contour of the housing sections 22, 24, 26, which is not however shown.

In the embodiment, the pump ring 14 is at least partially in contact with the first lateral section 24 and the second lateral section 26, in order to make possible a pressing of the pump ring 14 in this region and in order to seal off the pump chamber more effectively.

The second bearing 118 is firmly connected with the second lateral section 26 and is therefore also centered at the intended point following installation of the second section 26 in the annular portion 22, that is to say the centering of the second lateral section 26 with the aid of the outer surface 172 also results in a centering of the second bearing 118.

Installation of the Shaft

Figure 18:
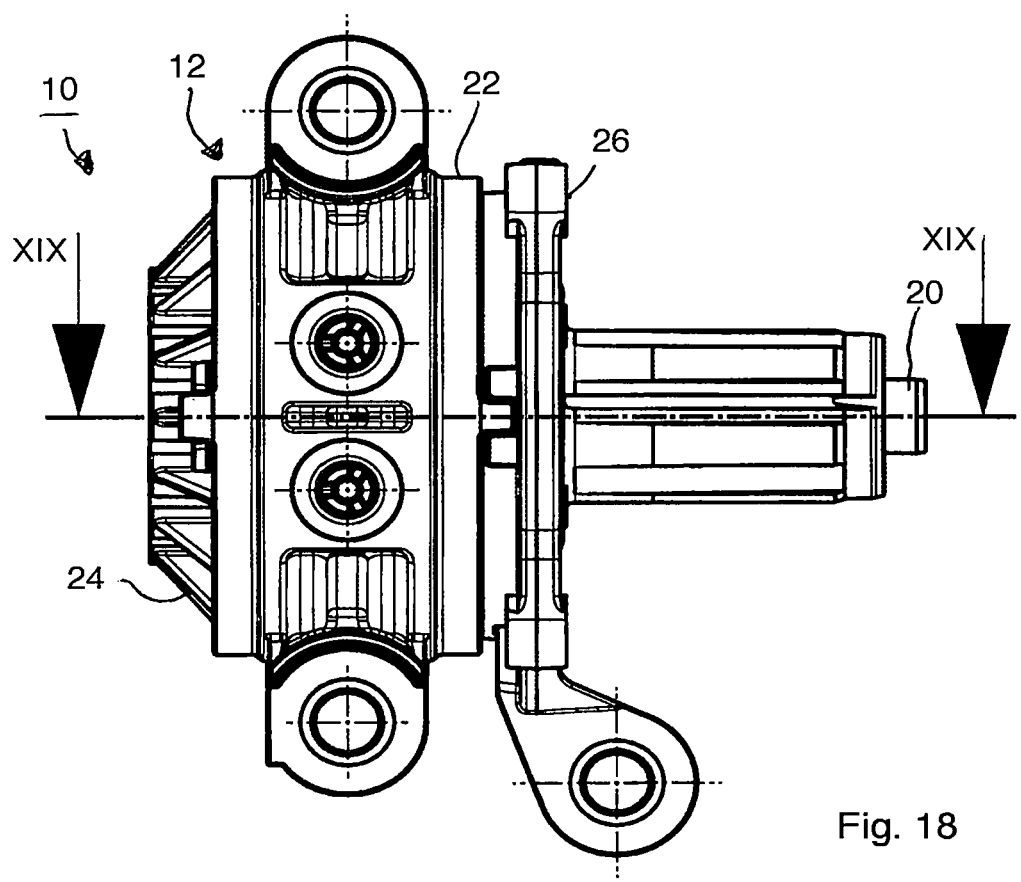
FIG. 18 shows a side view of the hydraulics housing from FIG. 1 with shaft mounted thereon.
Figure 19:
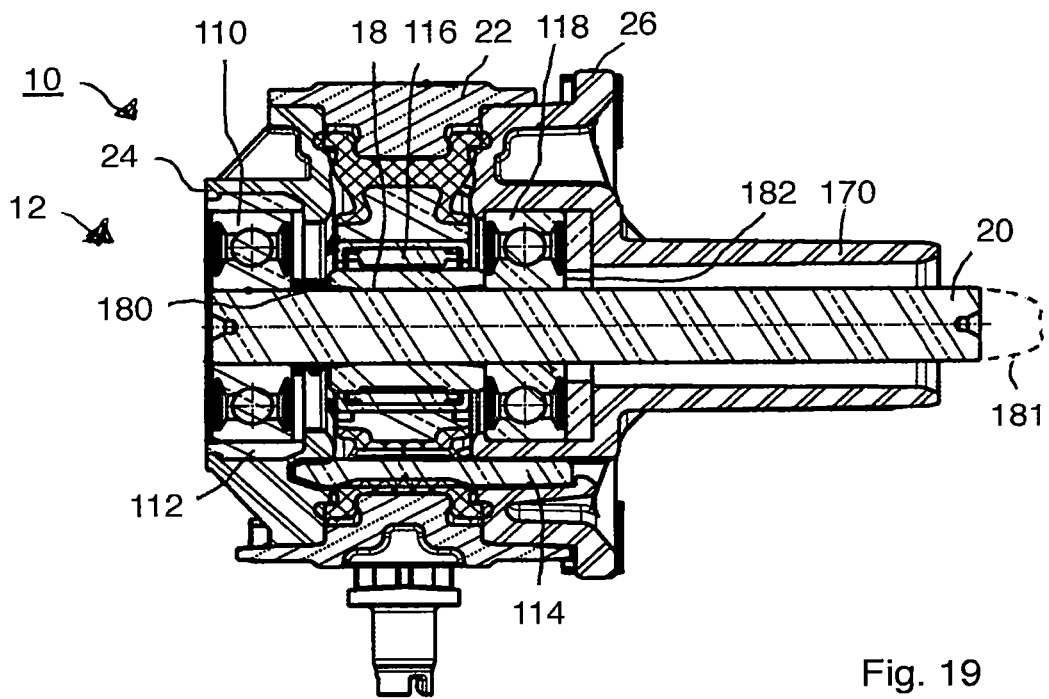
FIG. 19 shows a longitudinal section through the hydraulics housing from FIG. 18.

FIG. 18 shows the pump device 10 following installation of the shaft 20. FIG. 19 shows a longitudinal section through the pump device 10 along the line XIX-XIX shown in FIG. 18.

According to one embodiment, the installation of the shaft 20 can proceed as follows. Starting out from the installation state according to FIG. 17, the eccentric 18 is pushed into the eccentric bearing 116 until it comes to rest against the inner ring of the second bearing 118. A tubular tool—not shown—can be pushed into the tubular region 170 from the right-hand side, as seen in FIG. 19, until it comes to rest against the axial side 182 of the inner ring of the second bearing 118 and can protect this against a movement to the right. The shaft 20 can then be pushed from left to right through the eccentric 18 and through the second bearing 118 with a tapering attachment 181, for example a conical attachment 181, provided on its front end, wherein the conical attachment 181 serves to orient the eccentric 18 during insertion, so that the inner recess of the eccentric 18 is centered relative to the shaft 20. The attachment 181 can be removed after the shaft 20 has been pushed or pressed in, or can fall off automatically as soon as it is freed. In the illustrated embodiment, on pushing the shaft 20 in from left to right the shaft 20 is pressed together with the second bearing 118, so that this can serve as a fixed bearing.

Preferably, pushing the shaft 20 in from left to right also creates a press-fit connection between the shaft 20 and the eccentric 18, and as a result an additional fastening step, for example by means of an adhesive, can be avoided. In a next step, a spring 180 can be pushed onto the shaft 20, and the first bearing 110 can be pushed in between the first lateral section 24 and the shaft 20.

In the exemplary embodiment, the first bearing 110 is designed as a roller bearing with an inner ring and an outer ring; however, a slide bearing can, for example, also be used.

Preferably, the outer ring of the first bearing 110 is firmly connected with the first lateral section 24 or with the socket 112, for example through a press-fit connection or adhesive bonding. In the exemplary embodiment, the inner side of the first bearing 110 is not firmly connected with the shaft 20; instead, a relative movement is possible. As a result, the first bearing 110 acts as a floating bearing, and the spring 180 applies a force to the inner ring of the first bearing 110 in order to eliminate any play from the bearing arrangement 110, 118. Following installation, the shaft 20 is mounted radially through the first bearing 110 and the second bearing 118, and the second bearing 118, mounted as a fixed bearing, can absorb axial forces on the shaft 20.

The tool—not shown—which rests against the axial side 182 of the second bearing 118, when pressed on, absorbs the axial forces acting on the second bearing 118 during the pressing operation, so that these do not have to be transmitted via the bearing, possibly damaging the second bearing 118. Following installation of the shaft 20, the tool no longer needs to hold the inner ring of the second bearing 118 and the eccentric 18, and can therefore be removed.

Following installation of the shaft 20, the clamping element 114 can be pushed into the hydraulics housing 12 from the side of the second lateral section 26 until it is supported both in the first lateral section 24 and also in the second lateral section 26 and presses the pump ring 14 outwards in the region of the clamping element 114 and as a result seals off the pump chamber in this region.

Figure 20:
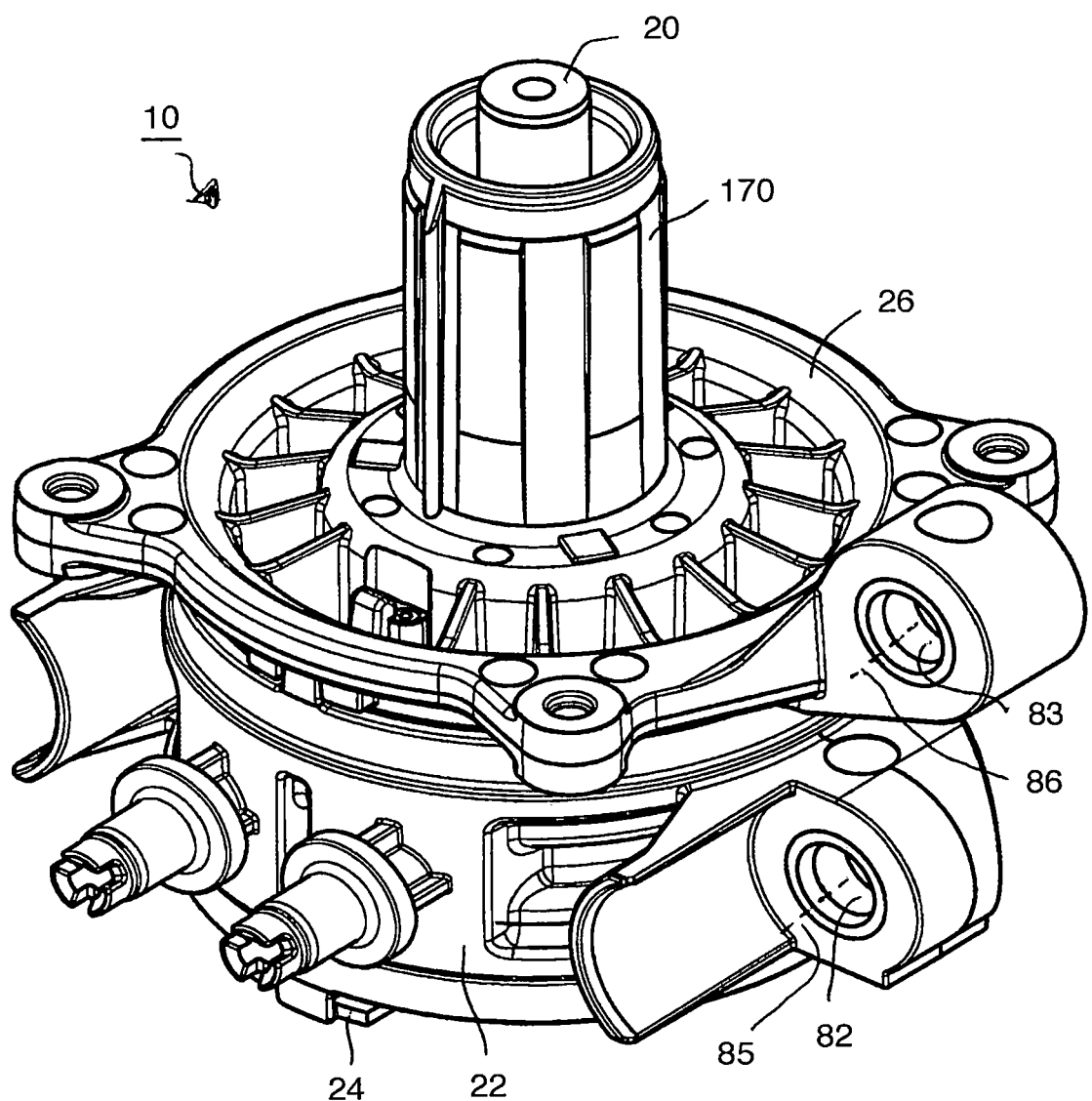
FIG. 20 shows a three-dimensional representation of the hydraulics housing from FIG. 18.

FIG. 20 shows a three-dimensional representation of the pump device 10 following installation of the shaft 20. The parallel orientation of the assembly openings 82, 83 can clearly be seen.

Installation of the Stator Arrangement and Rotor Arrangement

Figure 21:
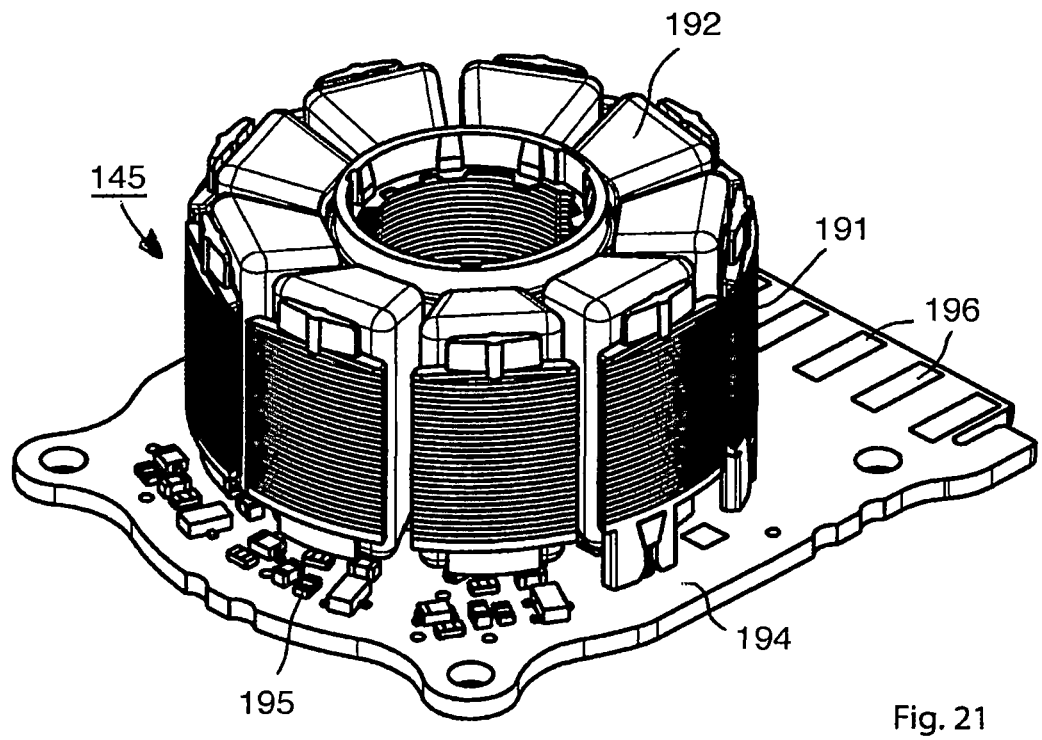
FIG. 21 shows a three-dimensional representation of a stator arrangement from FIG. 1.

FIG. 21 shows the stator arrangement 145 with a stator core 191 and a winding arrangement 192. The stator arrangement 145 is connected mechanically and electrically with a circuit board 194, and electronic components 195 and electrical connections 196 are provided on the circuit board 194. The stator arrangement 145 can be pushed onto the tubular region 170 of the second lateral section 26 together with the circuit board 194 (see FIG. 20) and fixed thereto. In this exemplary embodiment, the stator arrangement 145 is designed as an internal stator, and the stator arrangement can preferably be electronically commutated. In this exemplary embodiment, the stator core 191 is designed as a laminated core.

Figure 22:
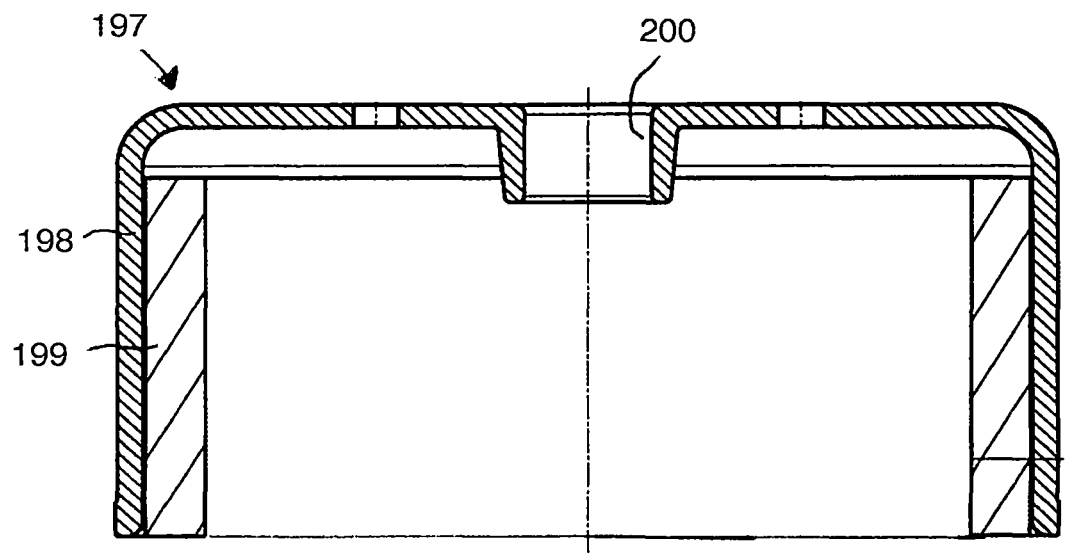
FIG. 22 shows a longitudinal section through a rotor arrangement from FIG. 1.

FIG. 22 shows a section 197 through the rotor arrangement 146, which comprises a rotor housing 198 and permanent magnets 199. The rotor arrangement 146 can be connected with the end of the shaft 20 associated with the tubular region 170 (see FIG. 20), in this exemplary embodiment via a hub 200. The connection can be made as a press-fit connection in that the opposite end of the shaft 20 is supported when connecting the rotor arrangement 146 with the shaft 20, in order to avoid placing a load on the bearings 110, 118 during pressing.

Figure 23:
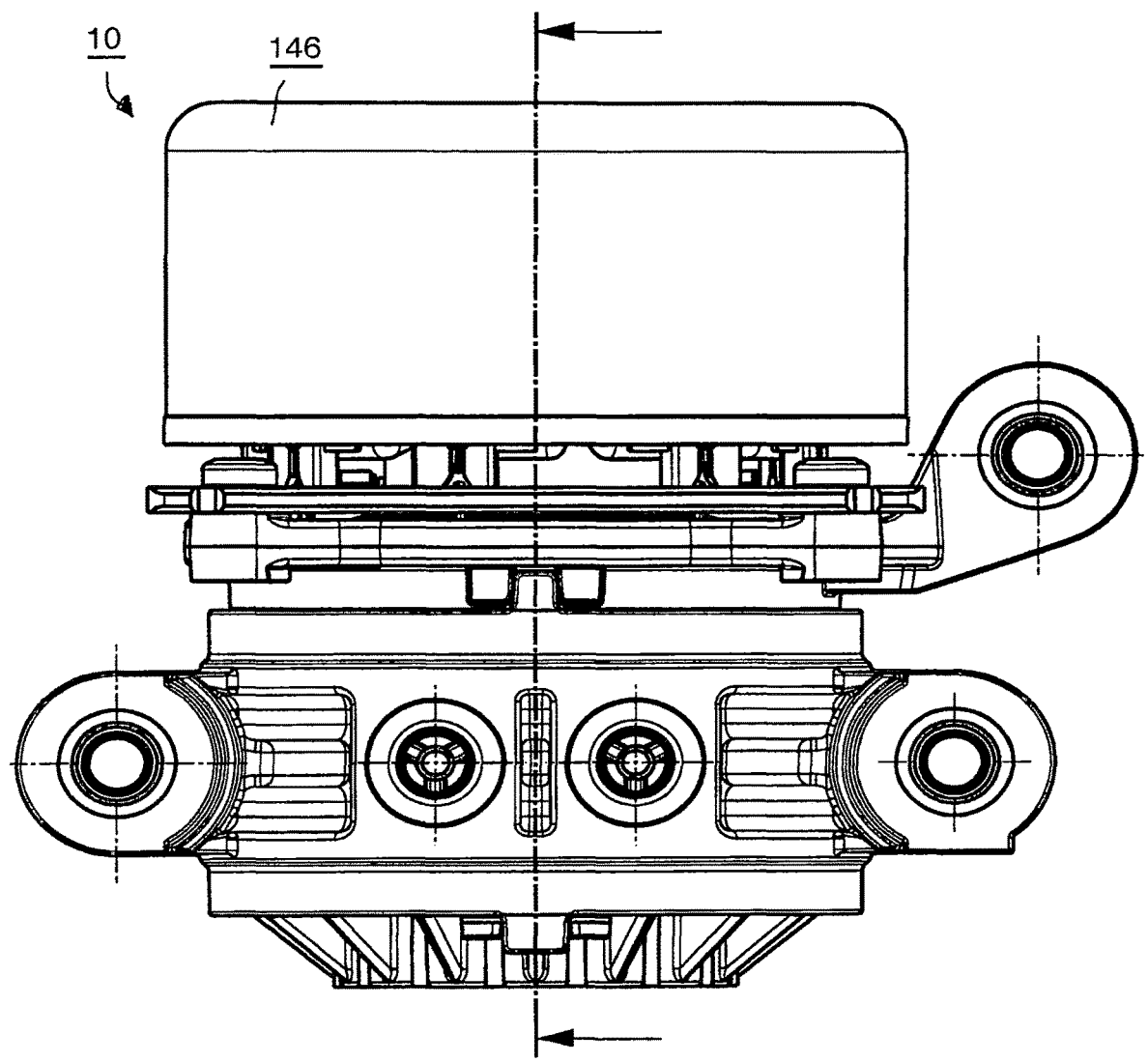
FIG. 23 shows a side view of the pump device from FIG. 1.

FIG. 23 shows the pump device 10 in its finally assembled state, i.e. with mounted stator arrangement 145 (see FIG. 21) and mounted rotor arrangement 146.

Figure 24:
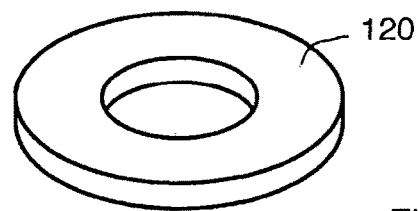
FIG. 24 shows three-dimensional representation of a sealing ring.

FIG. 24 shows the gasket 120.

Figure 25:
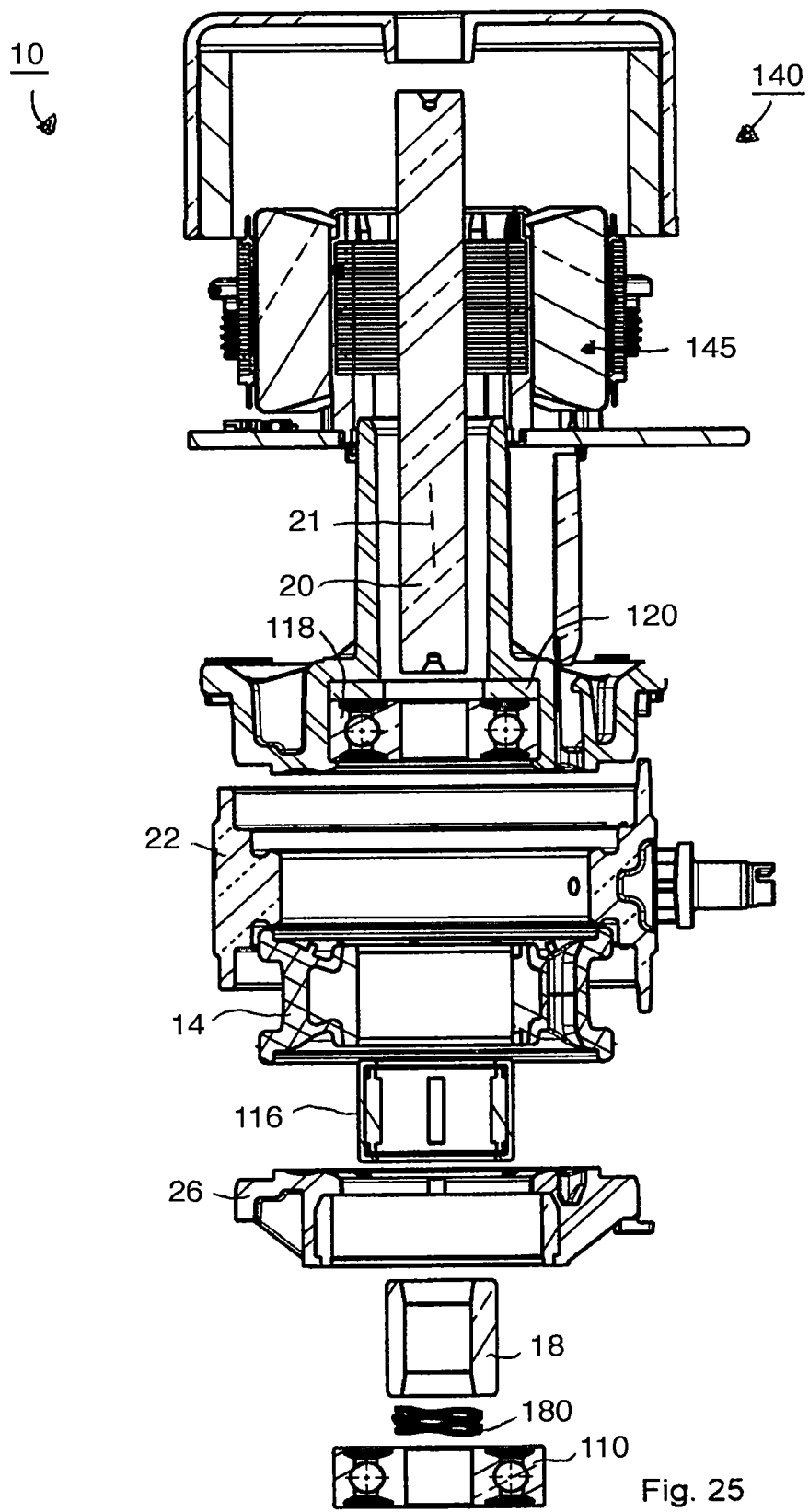
FIG. 25 shows an exploded view of the pump device from FIG. 1.

FIG. 25 shows the pump device 10 in an exploded view.

Figure 26:
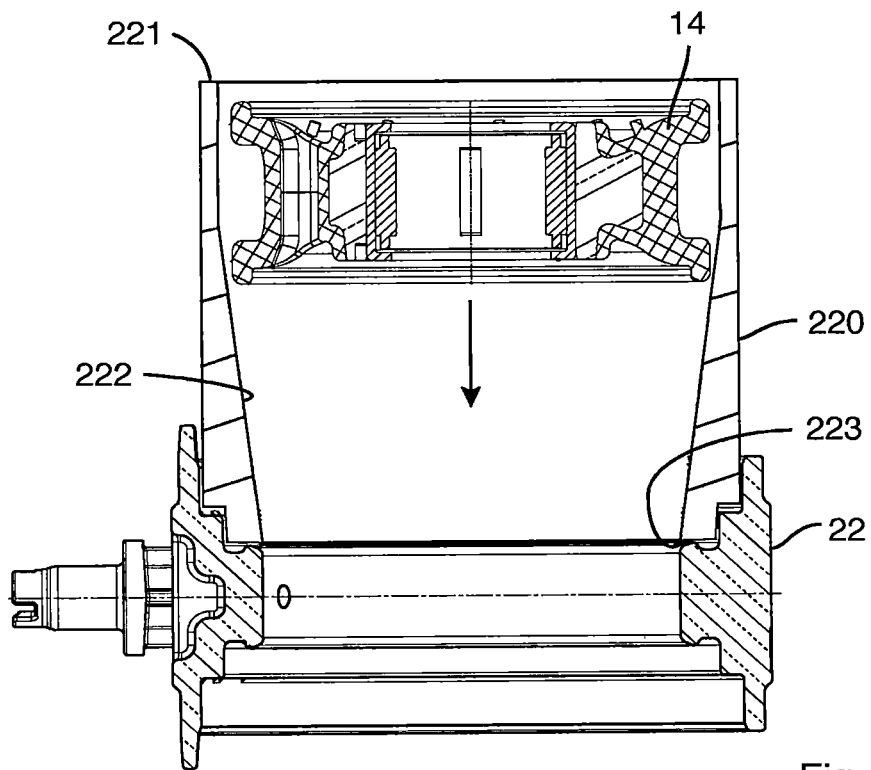
FIG. 26 shows a longitudinal section through an installation of a pump ring in an annular portion by means of a funnel.

FIG. 26 shows a funnel 220 which is preferably used to install the pump ring 14 in the annular portion 22. The funnel 220 has a first end 221 and a second end 223 opposite the first end 221. The funnel 220 narrows on the inner side, at least in parts, from the first end 221 to the second end 223, and as a result the pump ring 14 is compressed radially on being pushed into the funnel 220 towards the second end 223, so that in the radially compressed state it can slide against the inner region of the annular portion 22. The pump ring 14 then snaps, on a first side, into the annular portion 22, and following withdrawal of the funnel 220 it also snaps into the annular portion 22 on the second side.

The second end of the funnel 220 is preferably so small that it fits, at least partially, into the annular portion 22, so that the second end 223 can be arranged in the vicinity of the radially inner region of the pump ring. This more effectively prevents the pump ring 14 from expanding before it has reached its target position.

Figure 27:
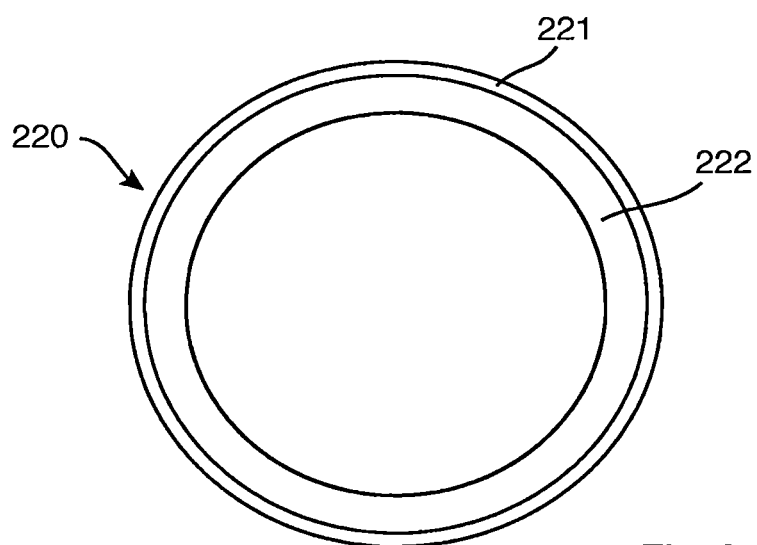
FIG. 27 shows a top view of the funnel from FIG. 26.

FIG. 27 shows the funnel 220 in a top view, and the narrowing region 222 can be seen.

Naturally, a wide range of variants and modifications are possible within the scope of the present invention.

For example, instead of the eccentric 18 and the eccentric bearing 116, a combined roller bearing with concentric inner ring and eccentric outer ring can be used.

The pump device 10 can also be designed without a pump ring support 16, in which case the pump ring needs to be somewhat stiffer, and the pump performance is reduced.

Alternatively, a slide bearing can be used as the second bearing 118.

The pump ring 14 can be made of an elastomeric material.

The invention claimed is:

1. A pump device (10) for pumping a fluid, comprising
a hydraulic housing (12) in which a pump ring (14) and an eccentric (18) are accommodated,
said eccentric (18) being connected via
a shaft (20) with a drive (140) in order to make possible a rotation of the eccentric (18) via the drive (140) and the shaft (20),
said shaft (20) defining an axial direction (21) and a radial direction of the pump device (10),
said hydraulic housing (12) including
an annular portion (22),
a first lateral section (24) and
a second lateral section (26), said annular portion having a first axial side (93) and a second axial side (94), said first lateral section (24) being arranged on the first axial side (93) and said second lateral section (26) being arranged on the second axial side (94),
said pump ring (14) being arranged, at least in portions, between the first lateral section (24) and the second lateral section (26), and said second lateral section (26) being designed as a drive flange for the drive (140);
a clamping element (114) which is configured to statically press the pump ring (14) against the annular portion (22) of the hydraulic housing (12) in a clamping element region (45); and
a recess (47) provided on the inner side of the first lateral section (24), said recess (47) being configured to accommodate the clamping element (114) at least partially, and thereby support it;
wherein the recess (47) is configured in the manner of a blind hole, in order to prevent the escape of a fluid which is being transported.

2. The pump device according to claim 1, wherein
the annular portion (22) has a first inner surface (91) which is in contact with an outer surface (161) of the first lateral section (24), and wherein
the annular portion (22) has a second inner surface (92) which is in contact with an outer surface (172) of the second lateral section (26).

3. The pump device according to claim 2, wherein the first inner surface (91) and the outer surface (161) of the first lateral section (24) are configured to limit a movement of the first lateral section (24) relative to the annular portion (22) in a radial direction, and
wherein the second inner surface (92) and the outer surface (172) of the second lateral section (26) are configured to limit a movement of the second lateral section (26) relative to the annular portion (22) in a radial direction.

4. The pump device according to claim 2, wherein the first inner surface (91) and the outer surface (161) of the first lateral section (24) are connected with one another by means of a first weld (910), and
wherein the second inner surface (92) and the outer surface (172) of the second lateral section (26) are connected with one another by means of a second weld (920).

5. The pump device according to claim 4, wherein the first weld (910) and the second weld (920) are, in each case, provided over at least 70% of the circumference of the annular portion (22).

6. The pump device according to claim 4, wherein the first weld (910) and the second weld (920) are, in each case, created in the form of a laser weld.

7. The pump device according to claim 6, wherein the first lateral section (24) comprises a first material adjacent an outer surface (161) thereof, wherein the annular portion (22) comprises a second material adjacent the first inner surface (91), and wherein the first material is characterized by a greater laser light absorptivity than the second material, in order to facilitate laser penetration welding.

8. The pump device according to claim 2, wherein the first inner surface (91), the second inner surface (92), the outer surface (161) of the first lateral section (24) and the outer surface (172) of the second lateral section (26) are made of plastic.

9. The pump device according to claim 1, wherein at least one assembly means (184, 185) with an assembly opening (81, 82) is provided on the annular portion (22), said assembly opening (81, 82) extending along a first assembly opening alignment direction (85) in order to facilitate assembly of the pump device (10).

10. The pump device according to claim 9, wherein at least one assembly means (186) with an assembly opening (83) is provided on the second lateral section (26), said assembly opening extending in a second assembly opening alignment direction (86) in order to make possible assembly of the pump device (10).

11. The pump device according to claim 10, wherein the first assembly opening alignment direction (85) and the second assembly opening alignment direction (86) are parallel to one another.

12. The pump device according to claim 1, wherein the second lateral section (26) has a tubular region (170), through which tubular region (170) the shaft (20) extends, at least in part.

13. The pump device according to claim 12, wherein the drive (140) has a stator arrangement (190), said stator arrangement (145) being attached to the tubular region (170) of the second lateral section.

14. The pump device according to claim 1, further comprising a second bearing (118) that is configured as a roller bearing with an inner ring and an outer ring, and wherein the eccentric (18) lies against the inner ring of the second bearing (118).

15. The pump device according to claim 1, further comprising a first bearing (110) that is configured as a floating bearing and a second bearing (118) that is configured as a fixed bearing.

16. The pump device according to claim 1, further comprising an eccentric bearing (116) disposed between the eccentric (18) and the pump ring (14) and configured as a needle bearing.

17. The pump device according to claim 16, wherein the eccentric bearing (116) has a lesser axial dimension than that of the eccentric (18).

18. The pump device according to claim 1, wherein the pump ring (14) is in contact with the first lateral section (24) and with the second lateral section (26).

19. A pump device (10) for pumping a fluid, comprising
a hydraulic housing (12) in which a pump ring (14) and an eccentric (18) are accommodated,
said eccentric (8) being connected via
a shaft (20) with a drive (140) in order to make possible a rotation of the eccentric (18) via the drive (140) and the shaft (20),
said shaft (20) defining an axial direction (21) and a radial direction of the pump device (10),
said hydraulic housing (12) including
an annular portion (22),
a first lateral section (24) and
a second lateral section (26), said annular portion having a first axial side (93) and a second axial side (94), said first lateral section (24) being arranged on the first axial side (93) and said second lateral section (26) being arranged on the second axial side (94),
said pump ring (14) being arranged, at least in portions, between the first lateral section (24) and the second lateral section (26), and said second lateral section (26) being designed as a drive flange for the drive (140); and
a clamping element opening (171) on the inner side of the second lateral section (26), said clamping element opening (171) being configured to accommodate a clamping element (114), at least partially, and thereby to support it;
wherein the clamping element opening is configured as a continuous opening, in order to make it possible to introduce the clamping element (114) from the outer side of the second lateral section (26).

20. A pump device (10) for pumping a fluid, comprising
a hydraulic housing (12) in which a pump ring (14) and an eccentric (18) are accommodated,
said eccentric (18) being connected via
a shaft (20) with a drive (140) in order to make possible a rotation of the eccentric (18) via the drive (140) and the shaft (20),
said shaft (20) defining an axial direction (21) and a radial direction of the pump device (10),
said hydraulic housing (12) including
an annular portion (22),
a first lateral section (24) and
a second lateral section (26), said annular portion having a first axial side (93) and a second axial side (94), said first lateral section (24) being arranged on the first axial side (93) and said second lateral section (26) being arranged on the second axial side (94),
said pump ring (14) being arranged, at least in portions, between the first lateral section (24) and the second lateral section (26), and said second lateral section (26) being designed as a drive flange for the drive (140);
wherein the second lateral section (26) has a shoulder (173), said shoulder (173) being configured to limit a movement of a second bearing (118) in an axial direction (21) towards the shoulder (173),
wherein a sealing ring (120) is provided between the shoulder (173) and the second bearing (118), the inner diameter (211) of which is greater than an inner diameter (212) of the second bearing (118).

21. The pump device according to claim 20, wherein the second lateral section (26) has a tubular region (170), and wherein the inner diameter (211) of the sealing ring (120) is smaller than an inner diameter (213) of the tubular region (170).

* * * * *